United States Patent [19]
Abe et al.

[11] Patent Number: 5,907,726
[45] Date of Patent: May 25, 1999

[54] RANGE FINDER SYSTEM

[75] Inventors: Tetsuya Abe; Sachio Hasushita, both of Hokkaido, Japan

[73] Assignee: Asahi Kogaku Kogyo Kabushiki Kaisha, Tokyo, Japan

[21] Appl. No.: 09/008,569

[22] Filed: Jan. 16, 1998

[30] Foreign Application Priority Data

Jan. 18, 1997 [JP] Japan ................................ 9-019885

[51] Int. Cl.⁶ .................................................. G03B 13/20
[52] U.S. Cl. ........................................ 396/141; 396/374
[58] Field of Search ............................ 396/89, 141, 374, 396/429

[56] References Cited

U.S. PATENT DOCUMENTS 5,099,265  3/1992  Lee ........................................... 396/374
5,666,577  9/1997  McIntyre et al. ........................ 396/429

*Primary Examiner*—Russell Adams
*Attorney, Agent, or Firm*—Greenblum & Bernstein, P.L.C.

[57] ABSTRACT

Disclosed is a range finder system which includes a virtual image type first optical system for observing an object, and a second optical system for electronically capturing image of at least a part of the object. The range finder system is provided with an LCD (liquid crystal display) which displays the image captured by the second optical system. The image displayed on the liquid crystal display is directed to the virtual image type finder optical system, and the image as displayed on the LCD is combined with the image observed through the first optical system. Thus, two images are observed by a photographer as superimposed. A display controller controls the LCD so that the degree of coincidence of the superimposed images is varied in the direction of a base length based on an object distance information.

10 Claims, 4 Drawing Sheets

RANGE FINDER SYSTEM

BACKGROUND OF THE INVENTION

The present invention relates to a range finder system using superimposed two images.

Conventional range finder system is provided with, for example, a first and a second windows arranged spaced apart from each other by a predetermined base line length. Light beams entered through the first and second windows are combined by a beam combiner such as a half mirror and then directed into a common eyepiece optical system. A photographer observes the dual image, which is formed by superimposing two images respectively corresponding to the first and second windows, of an object through the eyepiece optical system. A rotatable mirror is provided between the second window and the half mirror to vary the degree of coincidence of the superimposed two images in the direction of the base line, and a distance to the object is determined based on the angle of rotation of the rotatable mirror at which the two superimposed images of the object coincide.

In an interlocking type range finder, movement of a photographing lens is interlocked with the rotation of the rotatable mirror such that the photographing lens is brought into an in-focus position when the rotation angle of the rotatable mirror is adjusted and the superimposed images coincide.

Since the above-described range finder requires an optical path running from the first window to the eyepiece, and another optical path running from the second window to the half mirror and then to the eyepiece, a relatively large space is required which prevents cameras from being made compact. Further, in order to improve measurement accuracy in range finding, the base length needs to be sufficiently long, and a space for accommodating the optical path between the first and second windows becomes large.

SUMMARY OF THE INVENTION

It is therefore an object of the present invention to provide a range finder system which requires only a small space, and no precise mechanism such as the conventional interlocking mechanism as described above.

According to an aspect of the invention, there is provided a range finder system, comprising: a first optical system used for observing an image of an object through a first window; a second optical system that electronically captures image of at least a part of the object using light introduced through a second window, the second window being spaced apart from the first window by a predetermined base length; a display device for displaying a part of the image captured by the second optical system; an image superimposing system, which superimposes images of the part of the image captured by the second optical system on the image observed through the first optical system; and display controller which controls the display device to vary the degree of coincident of superimposed images in the direction of the base length in accordance with information related to a distance to the object.

Thus, since at least one of the two finder optical systems is constructed as an electronic image capturing system, and an image data therefrom is electronically processed and displayed on the display device so that the image is superimposed on the image observed in the field of view the other finder optical system. With this arrangement, the optical path for guiding the light introduced through the window of one of the two finder optical systems to the other finder optical system is unnecessary, and the space conventionally necessary for the coincidence type range finder system can be substantially reduced.

In particular, the first optical system is arranged independently of a photographing optical system of a camera in which the range finder system is employed.

Optionally, the first optical system may include an objective lens and an eyepiece lens, and the superimposing system may have a half mirror arranged between the first window and the eyepiece lens.

Further optionally, the range finder system may include a distance measuring system for measuring a distance to the object, and the information related to the distance to the object above may be an object distance measured by the distance measuring system.

Alternatively, the camera is provided with a focusing system which is operable to adjust the focusing condition of the photographing lens, and operating status of the focusing mechanism may be used as the information related to the distance to the object. In this case, the function of the range finder system is similar to the conventional range finder system, but the structure thereof is simplified.

Further optionally, the display device displays a part of the image captured by the second optical system so that the superimposed images are formed at a position corresponding to a center of a field of the first optical system.

Still optionally, the display device has a display area wider than a frame of the image to be displayed, and the display controller sets the frame of the image to be displayed at an arbitrary position within the display area of the display device. In this case, the range finder system may include a distance measuring system that measures a distance to the object at either one of a plurality of distance measuring areas defined within a field of the first optical system, and the display controller selects a position corresponding to one of the plurality of distance measuring areas.

Yet optionally, the first optical system may include an image capturing device that electronically captures an image of the object, and the superimposing system electronically superimposes images captured by the first optical system and the second optical system, the superimposed images being displayed on the display device.

According to another aspect of the invention, there is provided a camera which comprises a photographing optical system; a first optical system used for observing an image of an object through a first window, the first optical system being provided separately from the photographing optical system; a second optical system that electronically captures image of at least a part of the object using light introduced through a second window, the second window being spaced apart from the first window by a predetermined base length; a display device for displaying a part of the image captured by the second optical system; an image superimposing system, which superimposes images of the part of the image captured by the second optical system on the image observed through the first optical system; and display controller which controls the display device to vary the degree of coincident of superimposed images in the direction of the base length in accordance with information related to a distance to the object.

DETAILED DESCRIPTION OF THE PREFERRED EMBODIMENTS

With reference to the accompanying drawings, the embodiments of the present invention will be described.

Figure 1:
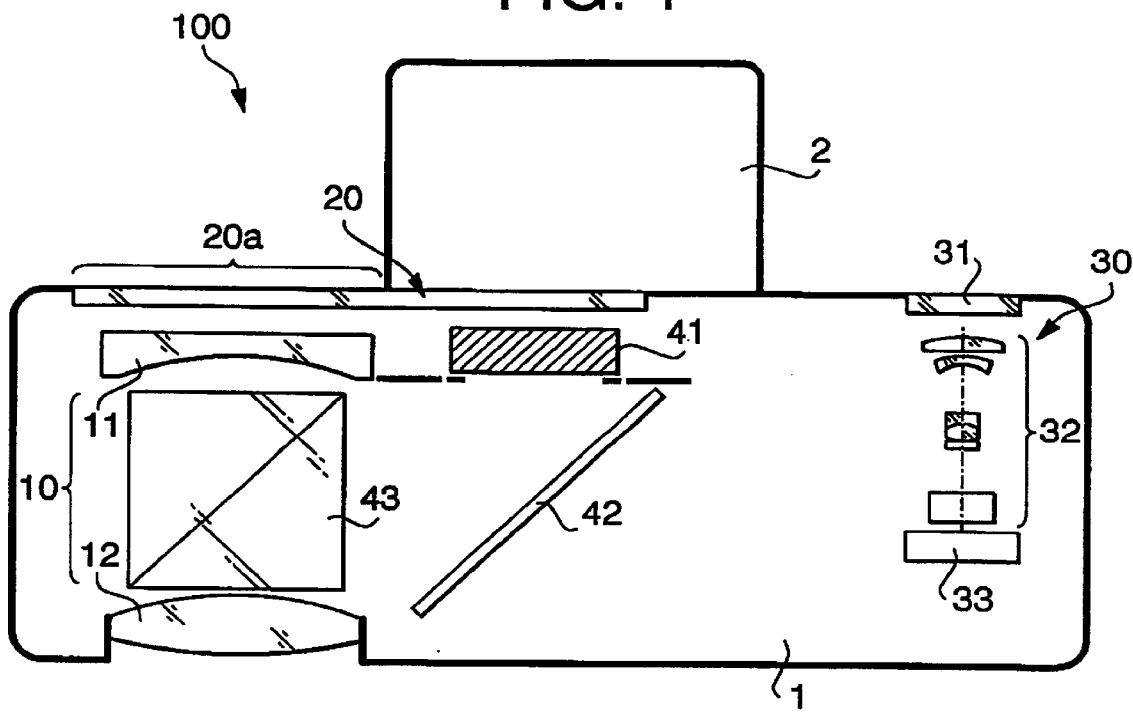
FIG. 1 schematically shows a camera employing a range finder system according to a first embodiment of the invention.

FIG. 1 schematically shows a camera 100 that employs a range finder system according to a first embodiment of the present invention.

To a camera body 1 of the camera 100, a lens barrel 2 housing a not shown photographing lens is coupled. The photographing lens constitutes a picture taking (or photographing) optical system which forms the image of an object on a film plane of the camera 100.

The range finder system is arranged in the upper portion of the camera body 1. The range finder system includes:

a virtual-image type first optical system 10 used by a photographer for observing an object;

a second optical system 30 for electronically capturing at least a part of image of the object;

a liquid-crystal display (LCD) 41 for displaying the at least part of the object image captured by the second optical system 30;

a mirror 42; and a half-mirror prism 43.

Light from the LCD 41 is directed to the half-mirror prism 43 via the mirror 42. Thus, image formed by the first optical system 10 and the image captured by the second optical system 30 and displayed on the LCD 41 are superimposed to form a dual image which is observed by the photographer.

The first optical system 10 includes an objective lens 11 having a negative power and an eyepiece lens 12 having a positive power. The first optical system 10 is arranged independently of a photographing optical system. The photographer views the object through a first window 20a which is part of a cover glass 20.

The second optical system 30 includes a second window 31, an image forming optical system 32, which converges a light beam introduced through the second window 31 that is arranged apart from the first window 20a by a predetermined base length, and a CCD image sensor 33.

The LCD 41 fully blocks light when it is in an inoperative state (not energized), while, in its operative state, the LCD 41 displays, within a predetermined display area thereof, a part of the image captured by the CCD image sensor 33. External light entering through the cover glass 20 illuminate LCD 41 from behind as a back light. Light passed through the display area when the LCD 41 is in the operative state is reflected by the mirror 42 and introduced into the half-mirror prism 43. Since light from the object also passed through the first window 20a and the objective lens 11 and is incident on the half mirror prism 43, light from the LCD 41 is combined with light of the first optical system. The combined light is then incident on the eye of the photographer through the eyepiece lens 12.

Figure 2:
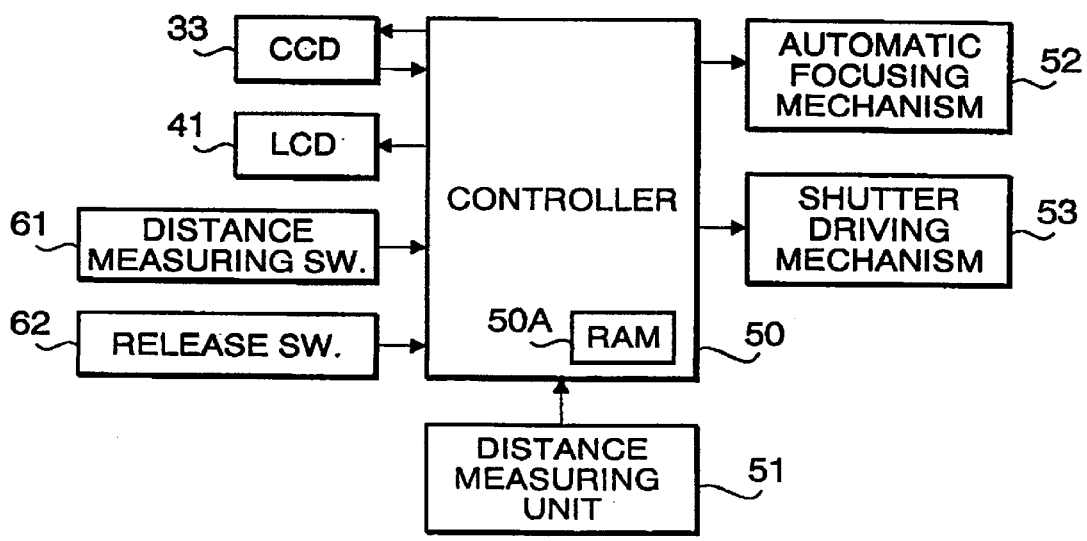
FIG. 2 is a block diagram showing a control system of the camera shown in FIG. 1.

FIG. 2 is a block diagram showing a control system of the camera 100. The output signal of the CCD image sensor 33 is transmitted to a controller 50. The controller 50 varies the degree of coincidence of the superimposed two images in the direction of the base line based on information regarding the distance to the object. The camera 100 has an automatic focusing function, and the controller 50 drives a focusing mechanism 52 to bring a focusing lens of the photographing optical system into an in-focus position based on the information regarding the distance to the object which is measured by a distance measuring unit 51.

The second optical system 30 has a field of view approximately identical to that of the first optical system 10, and a part of the image captured by the second optical system 30 is displayed on the LCD 41.

In this embodiment, the optical axis of the first optical system 10 is parallel with the optical axis of the second optical system 30, and the optical axis of the second optical system 30 intersects the center of the image receiving area of the CCD image sensor 33.

Figure 3A:
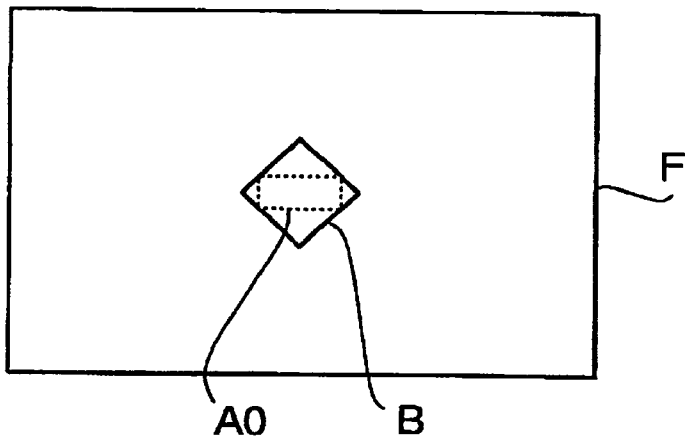
FIGS. 3A through 3C show explanatory images of the field of view of the range finder system.

The distance measuring unit 51 is designed to measure the distance to an object which is positioned at the central area of a photographing frame. The central area of the photographing frame is indicated, as shown in FIG. 3A, as a distance measuring area A0 within a field F of view of the range finder system when viewed through the eyepiece lens 12. In other words, the distance measuring unit 51 measures the distance to an object which is located in the distance measuring area A0 of the field of view F of the range finder system.

A frame B shown in FIG. 3A corresponds to the image displayed on the LCD 41 (the image displayed on the LCD 41 is observed in the frame B when viewed through the eyepiece lens 12). The position of the frame B is determined such that the image corresponding to the frame B is viewed at the center of the finder field F to overlap the distance measuring area A0. It should be noted that the frame B corresponds to a light transmissive area of LCD 41, and the light passing through the cover glass 20 and incident on the LCD 41 is allowed to pass through the LCD 41 within a area corresponding to the frame B, i.e., the light transmissive area of the LCD 41. The light is blocked on the remaining area of LCD 41. To block light on the area other than the portion corresponding to the frame B, an aperture plate may be placed between the cover glass and the LCD 41, or LCD 41 may be electrically controlled to partially shield the light.

In the above arrangement, when an object is located at infinity, the difference between the viewing angles to the object of the first optical system 10 and the second optical system 30 is zero. Therefore, image of a part of the object located at the central area of the field F of the first optical system 10 is also formed on the central portion of the CCD image sensor 33.

When the distance to the object is relatively short, the difference between the viewing angles of the object of the first optical system 10 and the second optical system 30 is relatively great. In this case, the image corresponding to a part of the object located at the central area of the field F of the first optical system 10 is formed on the CCD image sensor 33 with being shifted from the center of the CCD image sensor 33 in the direction of the base line. Specifically, due to parallax between first and second optical systems 10 and 30, the nearer the object is, the position of the image of the part of the object, which corresponds to the central part of the field F, formed on the CCD image sensor 33 is shifted with respect to the center thereof by a greater amount in the base length direction.

Image captured by the CCD image sensor 33 is stored in a RAM (Random Access Memory) 50A of the controller 50. Since the image of the object, which is located at the central portion of the field F of the first optical system 10, varies on the CCD image sensor 33, the address of the RAM 50A for the image data of the object corresponding to the central portion of the field F of the first optical system 10 varies depending on the distance to the object. The controller 50 is provide with a table indicating relationship between the various object distances and addresses of the RAM 50A at which the images of the object located at respective distances are formed.

With reference to the table, the controller 50 controls the LCD 41 to display the image using the image data stored at a corresponding address of the RAM 50A so that the object whose distance is detected is observed at the center of a dual image area, i.e., at the center of the frame B (and also at the center of the distance measuring area A0). Thus, the controller 50 uses the image data consisting of a predetermined number of pixels corresponding to the frame B, the address of the RAM 50A being varied in the direction of the base length in accordance with the detected distance to the object.

When the superimposed two images of the object observed in the frame B do not coincide, the photographer knows in advance that the photographing lens does not focus on the object of intent (i.e., the object the photgrapher intends to focus upon). When the two images of the object observed within the frame B coincide, the photographer knows that the object distance detected by the distance measuring unit 51 is the distance to the object on which the photographer intends to focus, and that the photographing lens is focused on the object when a photograph is taken.

The offset of the image formed on the CCD image sensor 33 is expressed by the following equation (1).

$$\Delta = m_M \cdot \delta \qquad (1)$$
$$= f_M / A1 \cdot \delta,$$

where, $\Delta$ represents an offset of the object image on the CCD image sensor 33, $m_M$ is a magnification of the image forming optical system 32, $f_M$ represent a focal length of the image forming optical system 32, A1 represents the object distance, and $\delta$ represents a distance between the optical axes of the first and second optical systems, i.e., the base line length.

Accordingly, when the controller 50 selectes the image data to be displayed on the LCD 41, the address of the RAM 50A is determined such that a point on the CCD image sensor 33 which is shifted by the distance $\Delta$ in the direction of the base line is located at the center of the LCD 41, i.e., at the center of the field B. As a result, the image captured by the CCD image sensor 33 is, when displayed on the LCD 41, shifted by an amount $\Delta'$ on the LCD 41, where $\Delta'$ is expressed by equation (2).

$$\Delta' = fo/A1 \cdot \delta \qquad (2)$$

where, fo represents a focal length of the objective lens 11, A1 represents the object distance, and $\delta$ represents the base line length.

Thus, if the object is located at infinity, A equals zero (i.e., the center of the image captured by the CCD image sensor 33 is to be displayed at the center of the LCD 41), and if the measured object distance is A1, the image displayed on the LCD 41 is to be shifted by the amount $\Delta'$.

The operation of the camera 100 during photographing will be described below. The photographer aims the camera 100 so that the intended object is located within the distance measuring area A0, and turns ON a distance measuring switch 61. When the distance measuring switch 61 is turned ON, the distance measuring unit 51 operates to measure the distance to the object located within the distance measuring area A0. At the same time, the CCD image sensor 33 operates to capture image and stored the image data in the RAM 50A. The controller 50 selects the predetermined amount of image data of the RAM 50A at the address corresponding to the measured object distance which is measured by the distance measuring unit 51, and displays the image on the LCD 41 based on the selected data. Specifically, the address of the RAM 50A is determined as described below.

After the photographer confirms that the intended object is focused, the photographer turns ON a release switch 62. When the release switch 62 is turned ON, the controller 50 drives the focusing mechanism 52 based on the object distance information to bring the photographing lens into the in-focus condition. Then the controller 50 controls a shutter driving mechanism 53 to drive a shutter to execute a exposure process.

Generally, both the distance measuring switch 61 and release switch 62 are turned ON or OFF by the shutter button. Specifically, the shutter button is constructed as a two-step switch, and when the shutter button is pressed by half a stroke, the distance measuring switch 61 is activated (i.e., turned ON), and when the shutter button is depressed by a full stroke, the release switch 62 is activated (i.e., turned ON).

In the camera having the automatic focusing function as described above, the superimposed two images formed in the finder are not used for focusing the photographing lens as in the conventional interlocking type range finder, but can be used to verify that the object of which the distance is measured by the distance measuring unit matches the object of interest on which the photographer intends to focus. More particularly, in the conventional camera having the viewfinder system independently of the photographing lens system, the photographer is unable to verify, in advance, whether the object of interest to the photographer is focused and correctly photographed. In the conventional cameras having the automatic focusing function, for example, when the auto focusing is initiated with the object not correctly matching the distance measuring area in the finder field, or when the object is a scene viewed through a window pane or flames and it is difficult to measure the object distance by means of the automatic focusing function, the photographing lens cannot be brought into the in-focus position with respect to the object of interest.

In this embodiment, this problem is resolved since the two images are formed based on the object distance information obtained by the distance measuring unit 51. The photographer can confirm that the distance measuring unit 51 has correctly measured the distance to the object of interest when the two images of the object of interest coincide, namely, the photographer knows, in advance, that the photographing lens can focus on the object of interest.

Figure 3B:
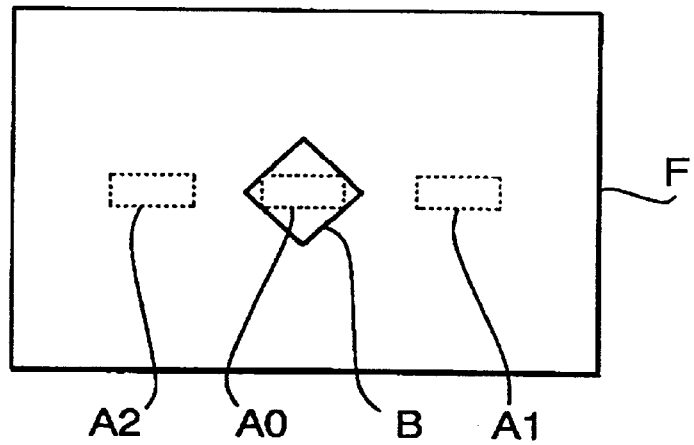
Figure 3C:
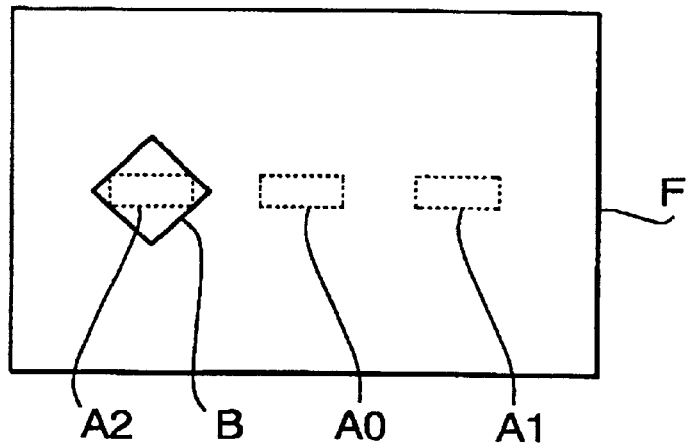

When the distance measuring unit 51 has three distance measuring areas A0, A1 and A2 horizontally arranged within the field F of the finder as shown in FIGS. 3B and 3C, the controller 50 controls the LCD 41 to form the frame B within the field F to meet one of the distance measuring areas A0, A1 and A2 within which the intended object is located. More particularly, when the photographing lens is focused on the object at the distance measuring area A0 located at the center of the field F, the frame B is aligned with the central distance measuring area A0 at the center of the field as shown in FIG. 3B. When the photographing lens is focused on the object at the distance measuring area A2 on the left-hand side, the frame B is aligned with the distance measuring area A2 on the left-hand side of the field as shown in FIG. 3C.

When, as shown in FIGS. 3B and 3C, the display area of the LCD 41 is set from among one of a plurality of locations, the selection of the image to be displayed in the frame B is performed similarly to the above-described embodiment. When the frame B overlaps the area A1 or A2, appropriate offset values (i.e., constant values) are to be included when address of the RAM 50A is determined.

Since the display area of the frame B within the field F is determined in accordance with which one of the areas A0 to A2 is selected, the photographer knows a portion of the object to be focusible among a plurality of distance measuring areas A0–A2, and further knows whether the photographing lens can correctly focus on that object in advance.

Figure 4:
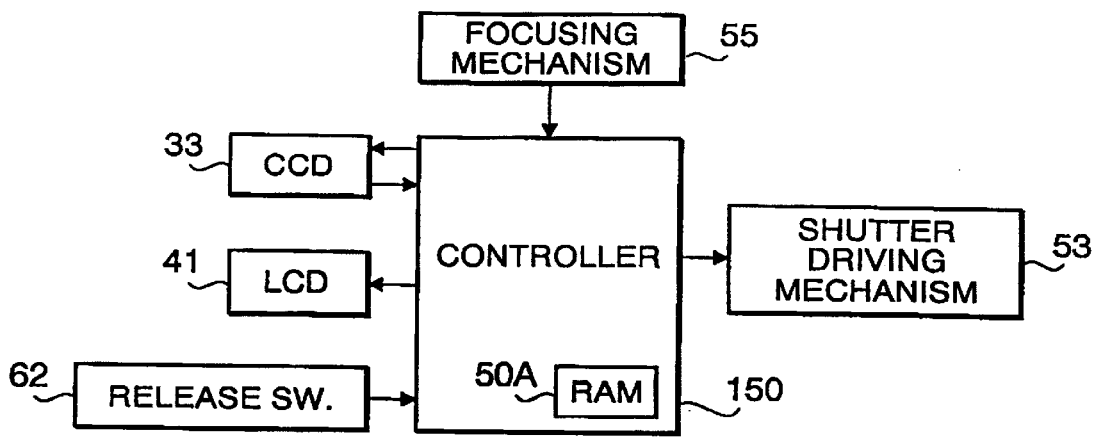
FIG. 4 is a block diagram showing the control system of a camera according to a second embodiment of the invention.

FIG. 4 shows a block diagram of a camera which does not have the automatic focusing function according to a second embodiment of the invention. The camera shown in FIG. 4 does not have a distance measuring system, and has a focusing mechanism 55 which is operated by a user to adjust a focusing condition of the photographing lens. Operating status of the focusing mechanism is input to a controller 150. The focusing mechanism 55 includes, for example, a code plate indicative of a position of the photographing lens and an encoder which outputs an detection signal indicative of position information in accordance with the position of the photographing lens (i.e., the code plate). In this case, the operation status of the focusing mechanism 55 has a one-to-one correspondence with the distance to the object. Similarly to the above-described first embodiment, the controller 150 selects the address of RAM 50A in accordance with the position information, i.e., the information input by the focusing mechanism 55, and controls the LCD 41 to display an image based on the predetermined amount of data stored at the selected address of the RAM 50A at the center of the LCD 41.

Similar to the first embodiment described-above, when the photographing lens is positioned at an out-of-focus position with respect to the object of interest, the superimposed two images observed within the frame B (see FIG. 3A) are shifted with respect to each other along the base line direction. When the photographing lens is located in an in-focus position with respect to the object of interest, the two images coincide. Therefore, in this second embodiment, the same advantage as the conventional interlocking type range finder can be obtained, with a relatively small space. The rest of the structure in FIG. 4 is identical to that of the first embodiment shown in FIG. 2 and description thereof will be omitted.

Figure 5:
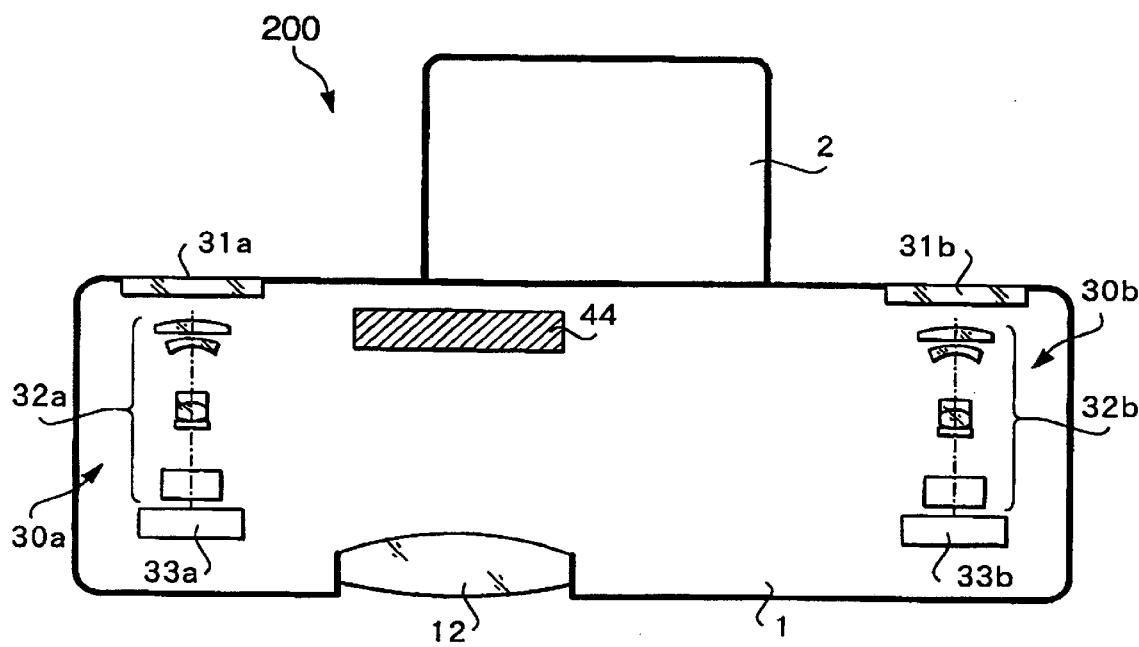
FIG. 5 shows a camera employing a range finder system according to a third embodiment of the invention.

FIG. 5 is a schematic view of a camera 200 employing a range finder system according to a third embodiment of the invention. The camera 200 has a camera body 1 and a lens barrel 2. A pair of optical systems 30a and 30b, each identical to the optical system 30 in the first embodiment, are employed. Components similar to those of the first embodiment will be assigned the same reference numerals and description thereof will be omitted.

Figure 6:
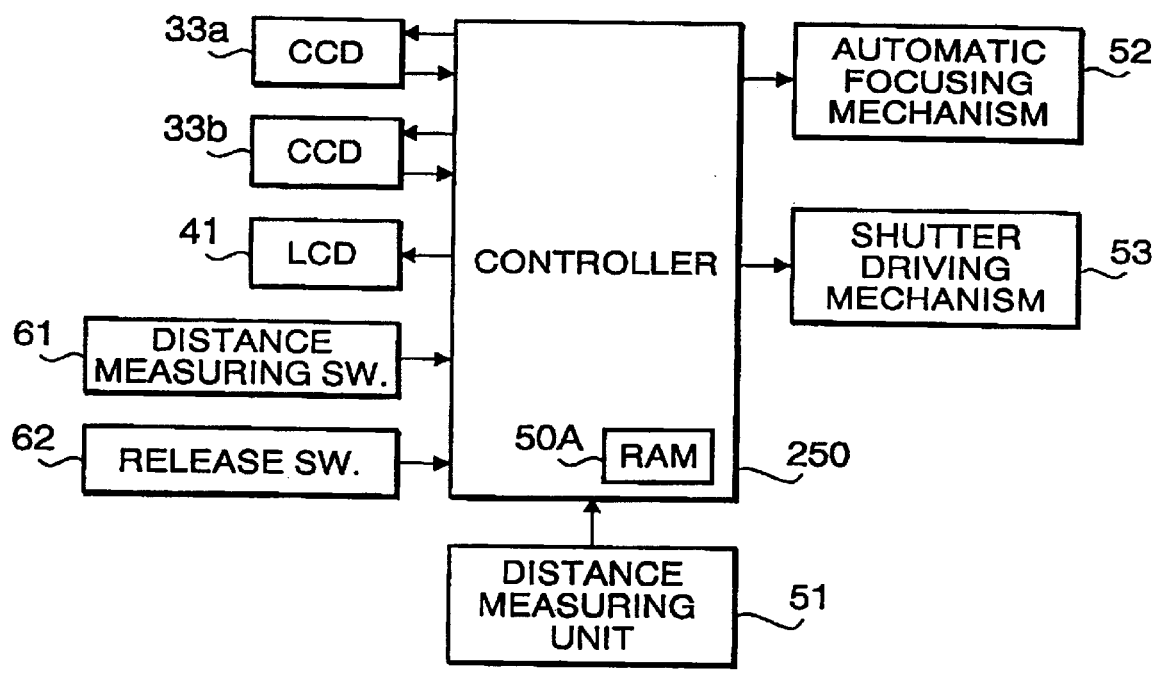
FIG. 6 is a block diagram showing the control system of the camera shown in FIG. 5.

In a structure shown in FIG. 5, light from an object enters through a first window 31a and is focused on a first CCD image sensor 33a through a first image forming optical system 32a. Thus captured image is stored in a RAM 50A (see FIG. 6), and displayed on LCD 44 by a controller 250 which is shown in FIG. 6. Based on the image data stored in the RAM 50A, LCD 44 displays an image within a area substantially identical to that of the field of view of an photographing lens. On the other hand, light entered through the second window 31b is focused on a second CCD image sensor 33b through a second image forming system 32b. The image captured by the second CCD image sensor 33b is also stored in the RAM 50A. The controller 250 superimposes, at the center of LCD 44, part of the image, which is captured by the second CCD image sensor 33b, on the image captured by the first CCD image sensor 33a. In this embodiment, again, a field having a frame B of two images is formed in the same way as shown in FIG. 3A, and the photographer can observe the object by viewing LCD 44 through the eyepiece lens 12. In this embodiment, the controller 50b electronically combines two images based on the outputs from two CCD image sensors 33a and 33b.

Since the first and second optical systems 30a, 30b are spaced apart by a predetermined base length with their optical axes in parallel, parallax errors occur between the images produced by the first and second CCD image sensors 33a, 33b.

In the above arrangement, when an object is located at infinity, the difference between the viewing angles to the object of the first optical system 30a and the second optical system 30b is zero. Therefore, image of a part of the object located at the central area of the first CCD image sensor 33a is also formed on the central portion of the second CCD image sensor 33b.

When the distance to the object is relatively short, the difference between the viewing angles to the object of the first optical system 30a and the second optical system 30b is relatively great. In this case, the image corresponding to a part of the object located at the central area the CCD image sensor 33a is formed on the CCD image sensor 33b with being shifted from the center of the CCD image sensor 33b in the direction of the base length. Specifically, due to parallax between both first and second optical systems 30a and 30b, the nearer the object is, the position of the image, which corresponds to the center of the first CCD image sensor 33a, on the CCD image sensor 33b is shifted with respect to the center of the second CCD image sensor 33b by a greater amount in the base length direction.

The controller 50a is provided with a table indicating an image of a part of an object formed on the central portion of the first CCD image sensor 33a and a position of the image of the same portion of the object on the second CCD image sensor in relation to an object distance.

With reference to the table, the controller 250 controls the LCD 44 to display the image using the image data captured by the first and second optical system 30a and 30b, and stored in the RAM 50A such that the object whose distance is detected is observed in alignment within a dual image area, i.e., the central area of the LCD 44. Thus, the controller 250 uses the image data captured by the first CCD image sensor 33a, and a predetermined amount of the image data, which has been captured by the second CCD image sensor 33b, starting from the address that is determined based on the detected object distance. It should be noted, that the address of the RAM 50A being varied in the direction of the base length in accordance with the detected distance to the object.

When the object of interest is observed in alignment within the frame B, the photographer knows that the object distance measured by the distance measuring unit 51 corresponds to the object on which the photographer intends to focus.

As described above, according to the present invention, at least one of the two finder optical systems is constructed as an electronic image capturing system, and an image therefrom is electronically processed and displayed on a display device so that the image is then superimposed on the field of the other finder optical system. With this arrangement, the optical path for guiding the light introduced through the a window of one of the two finder optical systems to the other finder optical system is unnecessary, and the space conventionally necessary for coincidence type range finder system can be substantially reduced.

The present disclosure relates to subject matter contained in Japanese Patent Application No. HEI 09-19885, filed on Jan. 18, 1997, which is expressly incorporated herein by reference in its entirety.

What is claimed is:

1. A range finder system, comprising:

a first optical system used for observing an image of an object through a first window;

a second optical system that electronically captures image of at least a part of said object using light introduced through a second window, said second window being spaced apart from said first window by a predetermined base length;

a display device for displaying a part of the image captured by said second optical system;

an image superimposing system, which superimposes images of said part of said image captured by said second optical system on the image observed through said first optical system; and display controller which controls said display device to vary the degree of coincident of superimposed images in the direction of said base length in accordance with information related to a distance to said object.

2. The range finder system according to claim 1, wherein said first optical system is arranged independently of a photographing optical system of a camera in which said range finder system is employed.

3. The range finder system according to claim 1, wherein said first optical system comprises an objective lens and an eyepiece lens, and wherein said superimposing system comprises a half mirror arranged between said first window and said eyepiece lens.

4. The range finder system according to claim 1, further comprising a distance measuring system for measuring a distance to said object, and wherein said information related to said distance to the object comprises an object distance measured by said distance measuring system.

5. The range finder system according to claim 1, further comprising a focusing mechanism for being operated to adjust a focusing condition of said photographing optical system, and wherein said information related to said distance to said object comprises an operating status of said focusing mechanism.

6. The range finder system according to claim 1, wherein said display device displays a part of said image captured by said second optical system so that said superimposed images are formed at a position corresponding to a center of a field of said first optical system.

7. The range finder system according to claim 1, wherein said display device has a display area wider than a frame of the image to be displayed, and wherein said display controller sets the frame of the image to be displayed at an arbitrary position within said display area of said display device.

8. The range finder system according to claim 7, further comprising distance measuring system that measures a distance to the object at either one of a plurality of distance measuring zones defined within a field of said first optical system, and wherein said display controller selects a position, on said display device, corresponding to one of said plurality of distance measuring zones.

9. The range finder system according to claim 1, wherein said first optical system comprises an image capturing device that electronically captures an image of said object, and wherein said superimposing system electronically superimposes images captured by said first optical system and said second optical system, said superimposed images being displayed on said display device.

10. A camera, comprising:

a photographing optical system;

a first optical system used for observing an image of an object through a first window, said first optical system being provided separately from said photographing optical system;

a second optical system that electronically captures image of at least a part of said object using light introduced through a second window, said second window being spaced apart from said first window by a predetermined base length;

a display device for displaying a part of the image captured by said second optical system;

an image superimposing system, which superimposes images of said part of said image captured by said second optical system on the image observed through said first optical system; and display controller which controls the display device to vary the degree of coincident of superimposed images in the direction of said base length in accordance with information related to a distance to said object.

* * * * *